June 2, 1964  H. F. HALSTED ET AL  3,135,203
ROCKET FIN
Filed April 18, 1961  3 Sheets-Sheet 1

INVENTORS
HAL F. HALSTED,
DAVID BENUN,
RUSSELL B. MAMONE &
HOWARD H. ANDERSON
BY Martha L. Ross
AGENT INVENTORS
HAL F. HALSTED,
DAVID BENUN,
RUSSELL B. MAMONE &
HOWARD H. ANDERSON
BY Martha L. Ross
AGENT

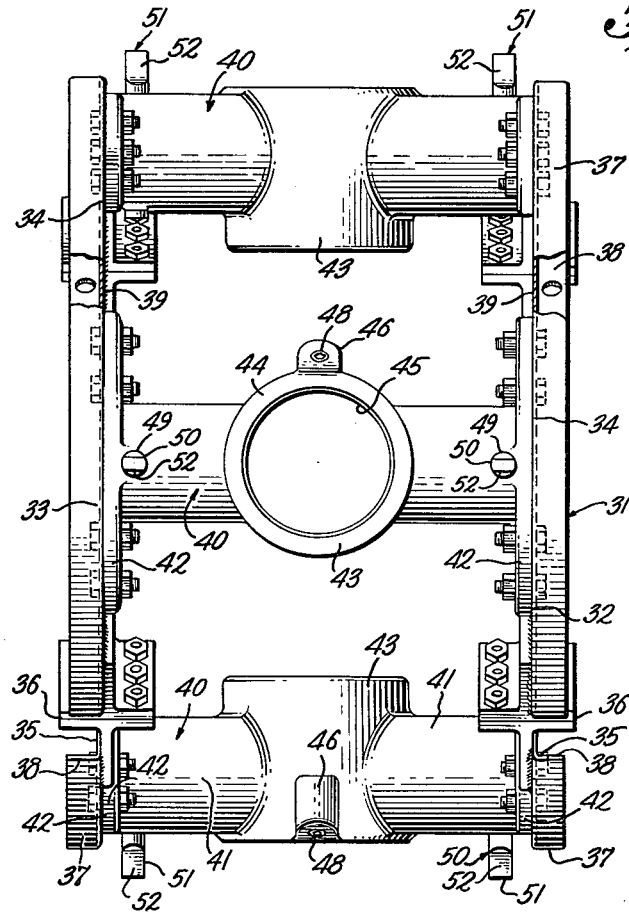
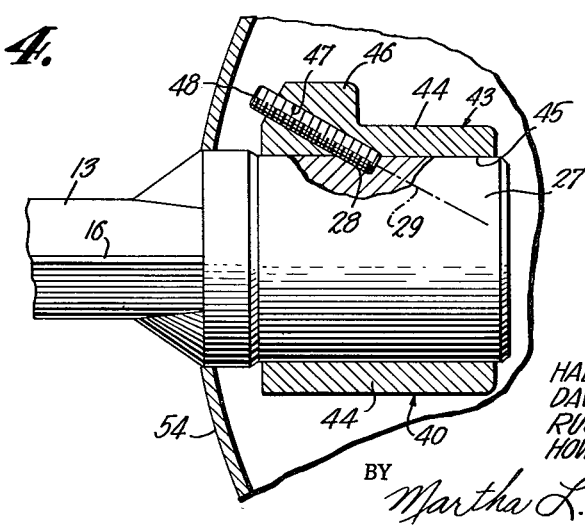

United States Patent Office 3,135,203
Patented June 2, 1964

3,135,203
ROCKET FIN
Hal F. Halsted, Monrovia, David Benun, Lynwood, Russell B. Mamone, Los Angeles, and Howard H. Anderson, La Puente, Calif., assignors to Atlantic Research Corporation, Fairfax County, Va., a corporation of Virginia
Filed Apr. 18, 1961, Ser. No. 103,849
9 Claims. (Cl. 102—50)

The present invention relates in general to rockets, and more particularly to fin assemblies for rocket vehicles and the attachment thereof to the body of the rocket vehicle.

Heretofore, it has been the customary practice in many types of rocket vehicles to affix fins to the vehicle body by welding. Specifically, in the case of certain rocket vehicles or rocket booster units, the fins have been customarily formed by welding together the various components of each fin and then the fins are welded directly to the quadrant assembly structure constituting the structural core or frame of the rocket or booster body. This welding of the components introduced a source of possible undesirable distortion of the fin, such as fin twist, bow and the like, and eliminated the possibility of adjustment of fin incidence setting in the field.

An object of the present invention is the provision of a novel rocket fin assembly construction wherein all welding is eliminated and which provides improved strength characteristics.

Another object of the present invention is the provision of a novel rocket fin assembly construction wherein the fins are mounted on the rocket motor case by means permitting adjustment of fin incidence setting in the field.

Another object of the present invention is the provision of a novel rocket fin assembly construction wherein the fins are attached to a supporting structure which is in turn fastened to the motor unit of a rocket vehicle in a manner permitting adjustment of fin incidence setting in the field.

Other objects, advantages and capabilities of the present invention will become apparent from the following detail description, taken in conjunction with the accompanying drawings, illustrating one preferred embodiment of the invention.

In the drawings:

FIGURE 3 is a side elevation of the ring assembly supporting structure for the fins;

FIGURE 4 is a fragmentary section view taken along the line 4—4 of FIGURE 1 illustrating the means for locking the fins in the ring assembly supporting structure.

Figure 1:
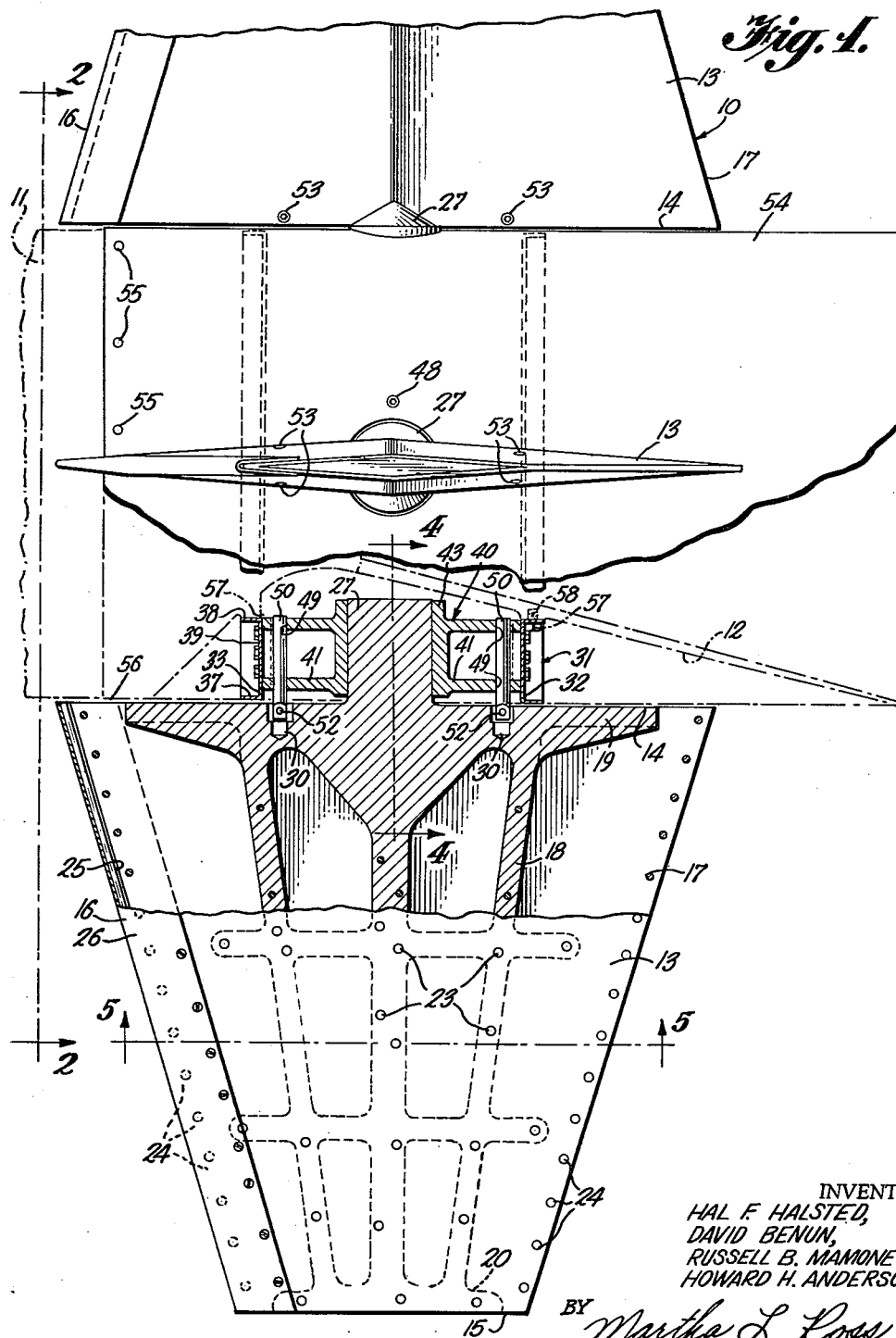
FIGURE 1 is a side elevation of a fin assembly for rocket vehicles constructed in accordance with the present invention, with parts of the assembly broken away to illustrate the internal construction thereof and illustrating in broken lines a fragmentary portion of the rocket vehicle to which the assembly is to be attached.
Figure 2:
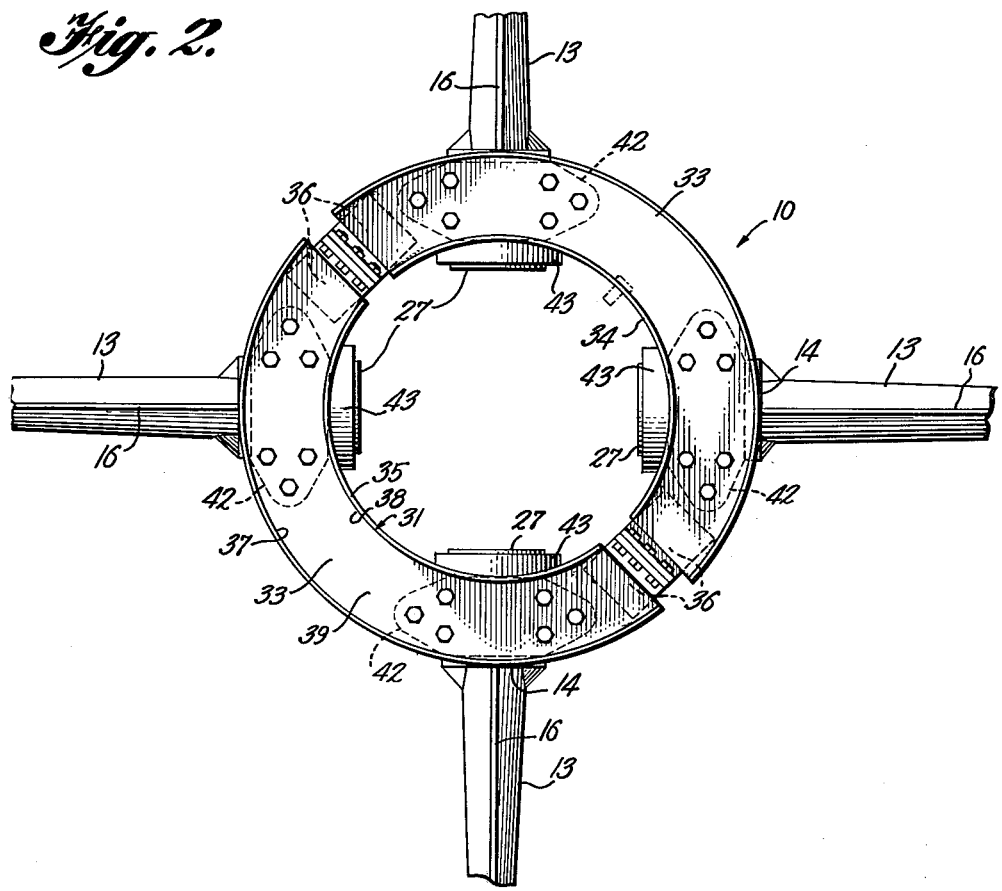
FIGURE 2 is a vertical transverse section view taken along the line 2—2 of FIGURE 1.
Figure 5:
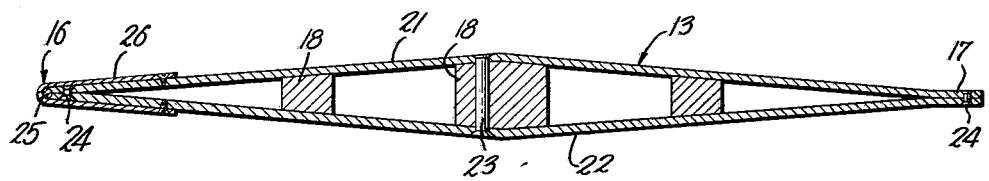
FIGURE 5 is a section view taken along the line 5—5 of FIGURE 1 illustrating the internal fin construction.

Referring to the drawings wherein like reference characters designate corresponding parts throughout the several figures, the fin assembly of the present invention, indicated generally by the reference character 10, is to be affixed to the aft or trailing portion of a rocket motor, a fragmentary portion of which is shown in broken lines in FIGURE 1 and designated by the reference character 11, the rocket motor 11 terminating at its trailing end in a rocket motor nozzle 12. It will be understood that the fin assembly 10 of the present invention may be used with a wide variety of rocket vehicles, or booster stages for rocket vehicles, the specific embodiment herein described being illustrated in association with the rocket motor and nozzle portion of a known ground-to-air anti-aircraft military rocket missile in the accompanying drawings.

The fin assembly 10 of this embodiment includes four fins 13 projecting radially from the axis of the rocket motor 11 in quadrature relation, each of the fins 13 being of substantially isosceles trapezoidal profile when viewed from the side thereof and having a root 14 disposed adjacent the rocket motor and a tip 15 of considerably shorter axial dimension than the root 14 spaced outwardly therefrom together with leading and trailing edges 16 and 17. The fins 13 are each constructed of a center spar casting structure 18 in the form of an integral open network of elongated elements shaped to establish the proper contour of the side surfaces of the fin and including a root plate section 19 and a tip plate section 20. The casting structure 18 of each fin is then covered with skin panels 21 and 22, each of which is securely fastened to the casting structure 18 by rivets, such as the rivets 23, extending through the elements of the casting structure 18. The overlapping leading and trailing edge portions of the skin panels 21 and 22 are also secured together with rivets 24. The leading edge 16 is further formed by disposing a rod 25 along the length of the leading edge 16 against the butting skin panel edges and covering the leading edge with a cap 26 secured by sheet metal screws to the skin panels 21 and 22.

Centrally located at the root 14 of each fin 13 is a journal member or stub 27 of somewhat larger diameter than the depth of the fins, the journal member 27 having a cylindrical configuration in which a canted socket 28 is provided in one side thereof having a cylindrical segment surface formed along an axis 29 inclined to the axis of the journal member 27 at an angle converging inwardly toward the rocket motor axis to intersect the axis of the journal member at some point intermediate the journal member and the rocket motor axis. The root plate section 19 of the casting structure also includes a pair of sockets 30 opening through the inner face of the root section and spaced symmetrically fore and aft of the axis of the journal member 27.

The fins 13 are all supported by a ring assembly supporting structure 31 comprising a pair of axially spaced rings 32 and 33 each formed of a pair of semicircular annular ring sections 34, 35 bolted together at T mounting brackets 36 which are welded to the adjacent portions of the associated ring sections 34, 35 at the ends thereof. The ring sections 34, 35 are each provided with outer and inner circumferential flanges 37, 38 and have bolted to the annular walls 39 thereof at quadrature related points fin mounts 40 which interconnect the rings 32 and 33 and extend parallel to the axis of the rocket motor. Each of these fin mounts 40 have aligned arm portions 41 terminating in flange formations 42 which are bolted flat against the annular walls 39 of the rings 32, 33 and include an integral journal receiving socket formation 43 centrally located between the flange formations 42. The socket formation 43 has an annular cylindrical wall 44 surrounding the cylindrical bore 45 and aligned with a radial axis relative to the rocket motor axis for receiving the journal member 27 of one of the fins 13. The bore 45 of the socket formation 43 is open at both ends and is dimensioned to snugly accommodate the journal member 27 of the fins 13. The annular wall 44 of each socket formation 43 has a boss 46 thereon containing a threaded bore 47 which extends through the boss 46 and wall 44 of each socket formation 43 to threadedly receive a fin restraining screw 48 at a position whereby the inner end of the fin restraining screw 48 will project into the canted cylindrical segment socket 28 in the side of the journal member 27 of the associated fin 13 to restrain the journal member against withdrawal from the bore 45 of the socket formation 43. The arm portions 41 of each fin mount 40 are of hollow construction to minimize weight, and include guide holes 49 adjacent each of the flange formations 42 for receiving a torque pin 50 and supporting the same along axis paralleling the axis of the journal member 27 and disposed substantially in alignment therewith along the fore and aft axis of the rocket motor. Each of the torque pins 50 is supported in the guide holes 49 therefor with an end portion 51 of each torque pin projecting outwardly of the outer circumferential flanges 37 of the rings 32, 33, the end portions 51 having flats 52 along two diametrically opposite side portions thereof and being adapted to be disposed within the sockets 30 of the root plate sections 19 of the associated fin 13. Fin incidence set screws 53 having externally accessible heads extend through threaded bores in the root plate section 19 of each fin 13 communicating with the sockets 30 whereby the inner ends of the set screws 53 bear against the flats 52 the torque pins 50 to permit adjustment of the fin incidence before the fin restraining screws 48 are tightened.

A shroud or fairing 54 in the form of a cylindrical tube is provided to be interposed between the ring assembly supporting structure 31 and the fins 13 in surrounding relation to the rocket motor nozzle 12 to provide proper aerodynamic characteristics. It will be noted from FIGURE 1 that the shroud 54 is provided with a plurality of screw holes 55 adjacent the leading edge thereof to receive screws for attaching the shroud 54 to the shoulder portion 56 of the rocket motor 11, the shoulder portion 56 being provided with threaded holes with which the screw holes 55 and associated screws register. The shroud 54 is also provided with suitable apertures for receiving the journal member 27 and torque pins 50 therethrough. In like manner, the inner circumferential flanges 37 of the rings 32, 33 in the ring assembly supporting structure 31 are configured to fit over the annular bosses or lands 57 on the rocket motor nozzle 12 and be affixed thereto by mounting screws 58.

In assembling the fin assembly to the rocket motor 12, the two half ring assemblies formed by the ring sections 34 and 35 of each ring 32, 33 and the fin mounts 40 are placed around the nozzle 12 and positioned to allow the inner circumferential flanges 38 to rest upon the annular bosses or lands 57 of the rocket nozzle. The screws are then fitted in the flange portions of the T mounting brackets 36 and adjusted sufficiently tightly to hold the ring half sections together but permit rotation of the ring assembly about the rocket motor nozzle 12. The ring assembly is then rotated until holes in the inner circumferential flanges 38 are aligned with corresponding threaded holes in the annular lands 57 and screws are inserted to fix the ring assembly to the rocket motor nozzle. The screws interconnecting the T mounting brackets 36 and the screws securing the inner circumferential flange 38 to the rocket motor nozzle are then tightened. The shroud 54 is then slid onto the rocket motor from the aft end and rotated until the screw holes 55 are aligned with the threaded holes in the shoulder portion 56 of the rocket motor 11, and bolts and washers are applied to securely fix the shroud to the rocket motor. The torque pins 50 are then inserted through holes provided in the shroud 54 and through the guide holes 49 in the arm portions 41 of the fin mounts 40, the radially inwardly disposed guide holes 49 and the inner ends of the torque pins 50 being threaded to permit the torque pins 50 to be secured in position. The journal members or stubs 27 of the fins 13 are then inserted through the holes provided therefor in the shroud 54 and into the bores 45 of the socket formations 43. Each fin restraining screw 48 is then adjusted to project the inner end thereof into the socket 28 in the associated fin journal member 27 but is not tightened at this time. Fin incidence is then adjusted by tightening the fin incidence set screws 53 on one side while loosening the set screw 53 on the other side of the fin until the fin incidence is appropriately adjusted. In one specific embodiment, the length of the fin incidence set screws and the dimensioning of the components cooperating therewith is such as to permit adjustment of the fin from approximately plus one-third degree to minus one-third degree, although by selection of different sizes of set screws, considerably greater ranges of incidence adjustment, for example, up to approximately plus or minus two degrees may be provided. After the incidence has been set, the incidence set screws 53 and the fin restraining screws 48 are all securely tightened and the assembly is completed.

While but one preferred example of the present invention has been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. In a rocket having an axially elongated rocket body portion, a fin assembly comprising a plurality of fins adapted to be supported in radially outwardly projecting relation surrounding said body portion, each of said fins including a root end portion having a cylindrical stub member projecting radially inwardly toward the axis of said body portion, supporting structure to be mounted on the rocket body portion in surrounding relation thereto including a plurality of circumferentially spaced fin mounts having radially outwardly opening sockets for receiving said stub members of said fins and supporting the fins for rotation about radial axes of said body portion and at least one projection extending radially outwardly and located eccentrically relative to the axis of each socket, said fin mounts having adjustable locking means for releasably locking said stubs in said sockets, and an adjustable member spaced from the stub axis and carried by the root portion of each fin projectable into bearing engagement with each of said projections for securing each of said fins in selected angular positions about their stub axes.

2. In a rocket of the type having a cylindrical rocket motor case terminating in a rearwardly opening rocket motor nozzle at the trailing end thereof, a fin assembly comprising a plurality of fins adapted to be supported in radially outwardly projecting relation surrounding said nozzle, each of said fins including a root end portion having a cylindrical stub member projecting inwardly along a radial axis of the rocket motor case and a pair of inwardly opening sockets spaced fore and aft from said stub member, supporting structure to be mounted on the rocket motor case in concentric surrounding relation including a plurality of circumferentially spaced fin mounts having radially outwardly opening sockets for receiving said stub members of said fins, said fin mounts having adjustable locking means for releasably locking said stubs in the sockets of the fin mounts, said fin mounts including stationary members projecting radially outwardly therefrom into said sockets in said root portion, and adjustable means in the root end portion of each fin spaced from the stub axis and bearing against said stationary members for securing each of said fins in selected angular positions about their stub axes.

3. In a rocket of the type having a cylindrical rocket motor case terminating in a rearwardly opening rocket motor nozzle at the trailing end thereof, a fin assembly comprising a plurality of fins adapted to be supported in radially outwardly projecting relation surrounding said nozzle, each of said fins including a root end plate portion having a fore and aft axis and having a cylindrical stub member projecting inwardly along a radius of a rocket motor case and at least one inwardly opening socket spaced along the fore and aft axis from said stub member, a ring assembly supporting structure including a pair of segmental annular ring members to be mounted on the rocket motor case and nozzle in concentric surrounding relation thereto, means for securing said ring members to the rocket motor case and nozzle, said supporting structure including a plurality of circumferentially spaced fin mounts extending between said ring members along axes paralleling the motor case axis each having an annular socket wall surrounding a radially outwardly opening socket for receiving and rotatably supporting a stub member of one of said fins, each of said annular socket walls having adjustable locking means for releasably locking said stub members in the socket of the mount, said fin mounts each including at least one radially outwardly projecting stationary lug member located eccentrically of the axis of the socket therein to extend into a socket in said root end plate portion, and adjustable set screw members in the root end plate portion of each fin projecting into the socket in said root end plate portion to bear against opposite sides of the stationary lug disposed therein along axes generally transverse to the motor case axis for varying the angular positions of said fins about the stub axes to effect adjustment of fin incidence setting.

4. In a rocket of the type having a cylindrical rocket motor case terminating in a rearwardly opening rocket motor nozzle at the trailing end thereof, a fin assembly comprising a plurality of fins adapted to be supported in radially outwardly projecting relation surrounding said nozzle, each of said fins including a root end plate portion having a cylindrical stub member projecting inwardly along a radius of a rocket motor case and a pair of inwardly opening sockets spaced fore and aft from said stub member, a ring assembly supporting structure including a pair of segmental annular ring members to be mounted on the rocket motor case and nozzle in concentric surrounding relation thereto, means for securing said ring members to the rocket motor case and nozzle, said supporting structure including a plurality of circumferentially spaced fin mounts extending between said ring members along axes paralleling the motor case axis each having an annular socket wall surrounding a radially outwardly opening socket for receiving and rotatably supporting a stub member of one of said fins, each of said annular socket walls having adjustable locking means for releasably locking said stub members in the socket of the mount, said fin mounts each including a pair of radially outwardly projecting stationary lug members located eccentrically of the axis of the socket therein in diametrically opposite relation along axes paralleling the motor case axis to extend into the sockets in said root end plate portion of one of said fins, and a pair of adjustable set screw members threaded in the root end plate portion of each fin adjacent and projectable into each of the sockets in said root end plate portion to bear against opposite sides of the stationary lug lying in their associated socket, said adjustable set screw members being adjustable along axes generally transverse to the motor case axis for varying the angular positions of said fins about the stub axes through selected ranges to permit adjustment of fin incidence setting.

5. In a rocket, the combination recited in claim 1 wherein said adjustable locking means comprises a fin restraining screw threaded into said fin mount for movement along an axis inclined inwardly toward the motor case axis at an acute angle to the axis of the socket in the associated fin mount and projectable into said socket, and the stub member of each of said fins having a locking recess in a side thereof for receiving an inner end portion of the fin restraining screw and having a locking surface inclined to the axis of the stub member to engage the inner end portion of the fin restraining screw and prevent withdrawal of the stub member from the socket therefor in said fin mounts.

6. In a rocket, the combination recited in claim 3 wherein said adjustable locking means comprises a fin restraining screw threaded into said fin mount for movement along an axis inclined inwardly toward the motor case axis at an acute angle to the axis of the socket in the associated fin mount and projectable into said socket, and the stub member of each of said fins having a locking recess in a side thereof for receiving an inner end portion of the fin restraining screw and having a locking surface inclined to the axis of the stub member to engage the inner end portion of the fin restraining screw and prevent withdrawal of the stub member from the socket therefor in said fin mounts.

7. In a rocket, the combination recited in claim 4 wherein said adjustable locking means comprises a fin restraining screw threaded into said fin mount for movement along an axis inclined inwardly toward the motor case axis at an acute angle to the axis of the socket in the associated fin mount and projectable into said socket, and the stub member of each of said fins having a locking recess in a side thereof for receiving an inner end portion of the fin restraining screw and having a locking surface inclined to the axis of the stub member to engage the inner end portion of the fin restraining screw and prevent withdrawal of the stub member from the socket therefor in said fin mounts.

8. In a rocket of the type having a cylindrical rocket motor case terminating in a rearwardly opening rocket motor nozzle at the trailing end thereof, a fin assembly comprising a plurality of fins adapted to be supported in radially outwardly projecting relation surrounding said nozzle, each of said fins including a root end plate portion having a cylindrical stub member projecting inwardly along a radius of a rocket motor case and a pair of inwardly opening sockets spaced fore and aft from said stub member, a ring assembly supporting structure including a pair of segmental annular ring members to be mounted on the rocket motor case and nozzle in concentric surrounding relation thereto, means for securing said ring members to the rocket motor case and nozzle, said supporting structure including a plurality of circumferentially spaced fin mounts extending between said ring members along axes paralleling the motor case axis each having an annular socket wall surrounding a radially outwardly opening socket for receiving and rotatably supporting a stub member of one of said fins, each of said annular socket walls having adjustable locking means for releasably locking said stub members in the socket of the mount, said fin mounts each including a pair of radially outwardly projecting removable torque pins having terminal flats on the ends thereof located eccentrically of the axis of the socket therein in diametrically opposite relation along axes paralleling the motor case axis to extend into the sockets in said root end plate portion of one of said fins, and a pair of adjustable set screw members threaded in the root end plate portion of each fin adjacent and projectable into each of the sockets in said root end plate portion to bear against the flats of the torque pin lying in their associated socket, said adjustable set screw members being adjustable along axes generally transverse to the motor case axis for varying the angular positions of said fins about the stub axes through selected ranges to permit adjustment of fin incidence setting.

9. In a rocket having an axially elongated rocket body portion, a fin assembly comprising a plurality of fins adapted to be supported in outwardly projecting relation surrounding said body portion, each of said fins including a root end portion having an inwardly projecting cylindrical stub member, supporting structure to be mounted on the rocket body portion in surrounding relation thereto including a plurality of circumferentially spaced fin mounts having outwardly opening sockets for receiving said stub members of said fins and supporting the fins for rotational movement and at least one outwardly extending projection located eccentrically relative to the axis of each socket, said fin mounts having adjustable locking means for releasably locking said stubs in said sockets and adjustable means spaced from the stub axis and carried by each fin projectable into bearing engagement with each of said projections for securing each of said fins in selected angular positions about their stub axes.

References Cited in the file of this patent

UNITED STATES PATENTS

| | | |
|---|---|---|
| 981,068 | Currell | Jan. 10, 1911 |
| 2,139,665 | Booker | Dec. 13, 1938 |
| 2,816,721 | Taylor | Dec. 17, 1957 |